United States Patent [19]
Morimoto

[11] Patent Number: 5,880,686
[45] Date of Patent: Mar. 9, 1999

[54] DECODING AND REGENERATING DEVICE FOR DECODING AND REGENERATING FRAME CODED DATA AND METHOD THEREFOR

[75] Inventor: Kouichi Morimoto, Kanagawa, Japan

[73] Assignee: NEC Corporation, Tokyo, Japan

[21] Appl. No.: 917,724

[22] Filed: Aug. 27, 1997

[30] Foreign Application Priority Data

Aug. 29, 1996 [JP] Japan .................................. 8-228916

[51] Int. Cl.[6] .......................... H03M 5/02; G11B 20/10
[52] U.S. Cl. ............................ 341/50; 341/106; 370/464
[58] Field of Search ..................... 341/50, 106; 370/441, 370/442, 464

[56] References Cited

U.S. PATENT DOCUMENTS

| | | | |
|---|---|---|---|
| 3,700,819 | 10/1972 | Marcus ...................................... | 370/69 |
| 3,774,201 | 11/1973 | Collins ................................. | 324/76.24 |
| 3,786,504 | 1/1974 | Collins .................................... | 342/192 |
| 3,890,469 | 6/1975 | Kelly et al. .............................. | 370/69 |

*Primary Examiner*—Marc S. Hoff
*Assistant Examiner*—Peguy JeanPierre
*Attorney, Agent, or Firm*—Sughrue, Mion, Zinn, Macpeak & Seas, PLLC

[57] ABSTRACT

A decoding and regenerating device for frame coded data comprises a decoding unit which decodes frame coded data which is obtained by coding time series signals of a plurality of channels by entering on a frame-by-frame basis at every channel; a regenerative data buffer memory which places memory blocks to form a square matrix of rows and columns in number corresponding to the number of channels and selects alternately in every frame period a first data arrangement that regenerative data for one frame of the respective channels is stored in every row of the square matrix and a second data arrangement that regenerative data for one frame of the respective channels is stored in every column, to store the regenerative data as a stored state of the regenerative data; and a data regenerating unit for reading to regenerate the regenerative data which is stored in the regenerative data buffer memory.

9 Claims, 8 Drawing Sheets

DECODING AND REGENERATING DEVICE FOR DECODING AND REGENERATING FRAME CODED DATA AND METHOD THEREFOR

BACKGROUNDS OF THE INVENTION

1. Field of the Invention

The invention relates to a decoding and regenerating device which decodes and regenerates frame coded data which is frame-coded on a channel-by-channel basis by sampling time series signals of a plurality of parallel channels and a decoding and regenerating method, and more particularly to a decoding and regenerating device for frame coded data which is characterized by a regenerative data buffer means for giving regenerative data to a data regenerating means at the appropriate times, and to a decoding and regenerating method.

2. Description of the Related Art

In the case of time series signals such as voice signals and music signals, the time series signals of a plurality of parallel channels are sampled, and with a predetermined time interval determined as one frame period, the signals are frame-coded on a frame-by-frame basis consisting of a plurality of samples contained in a single frame period with respect to the respective channels and stored in a medium, and desired frame coded data may be decoded and regenerated by a decoding and regenerating device.

Figure 7:
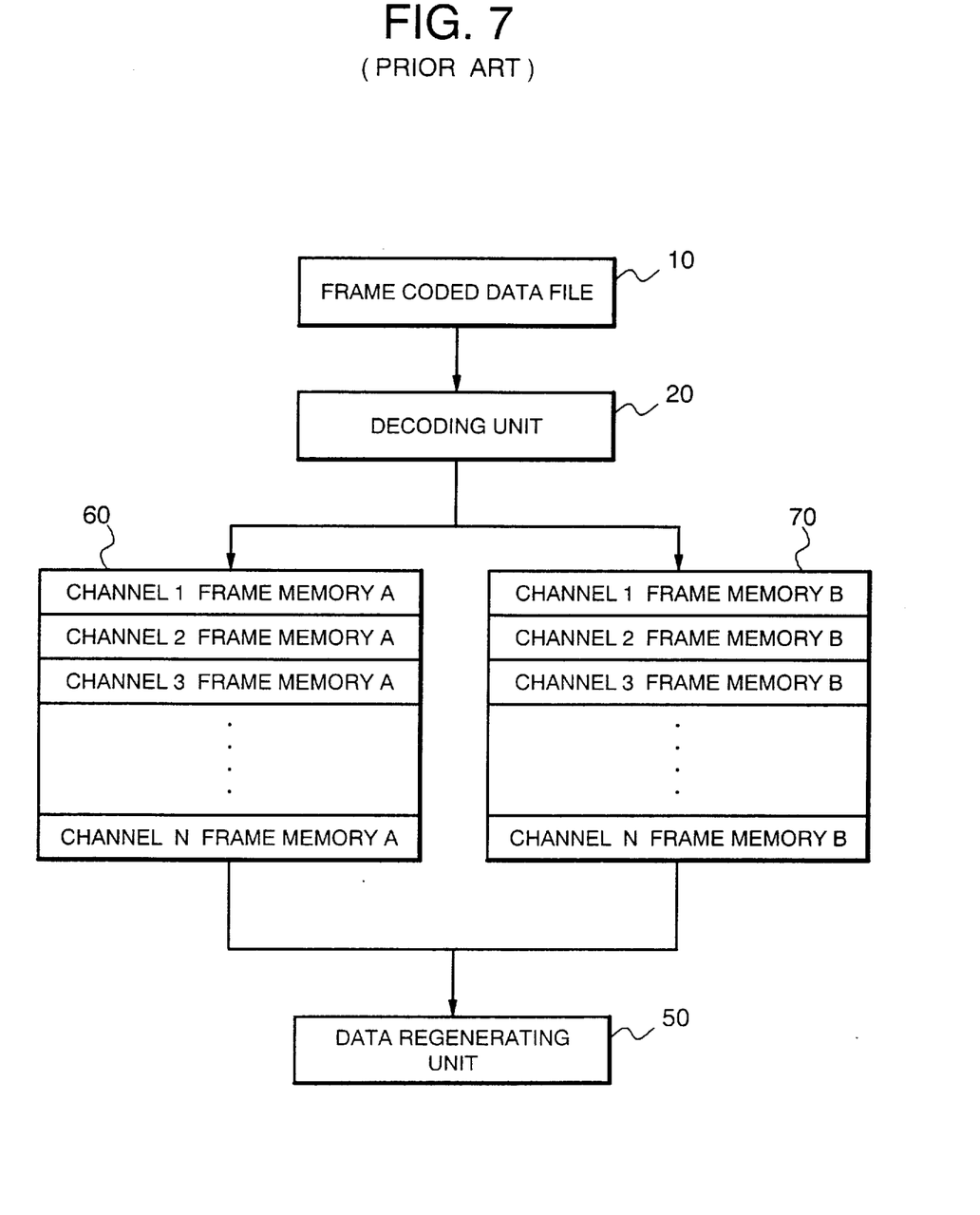
FIG. 7 is a block diagram showing the structure of a conventional decoding and regenerating device for frame coded data.

Conventionally, such a decoding and regenerating device as shown in FIG. 7 is provided with two groups of regenerative data buffer memories 60, 70 which contain frame memories for storing regenerative data for the number of samples of one frame, for all channels. And, regenerative data decoded by a decoding unit 20 is stored into the regenerative data buffer memories 60, 70 and alternately outputted in every frame period from the memories 60, 70 to a data regenerating unit 50.

Figure 8:
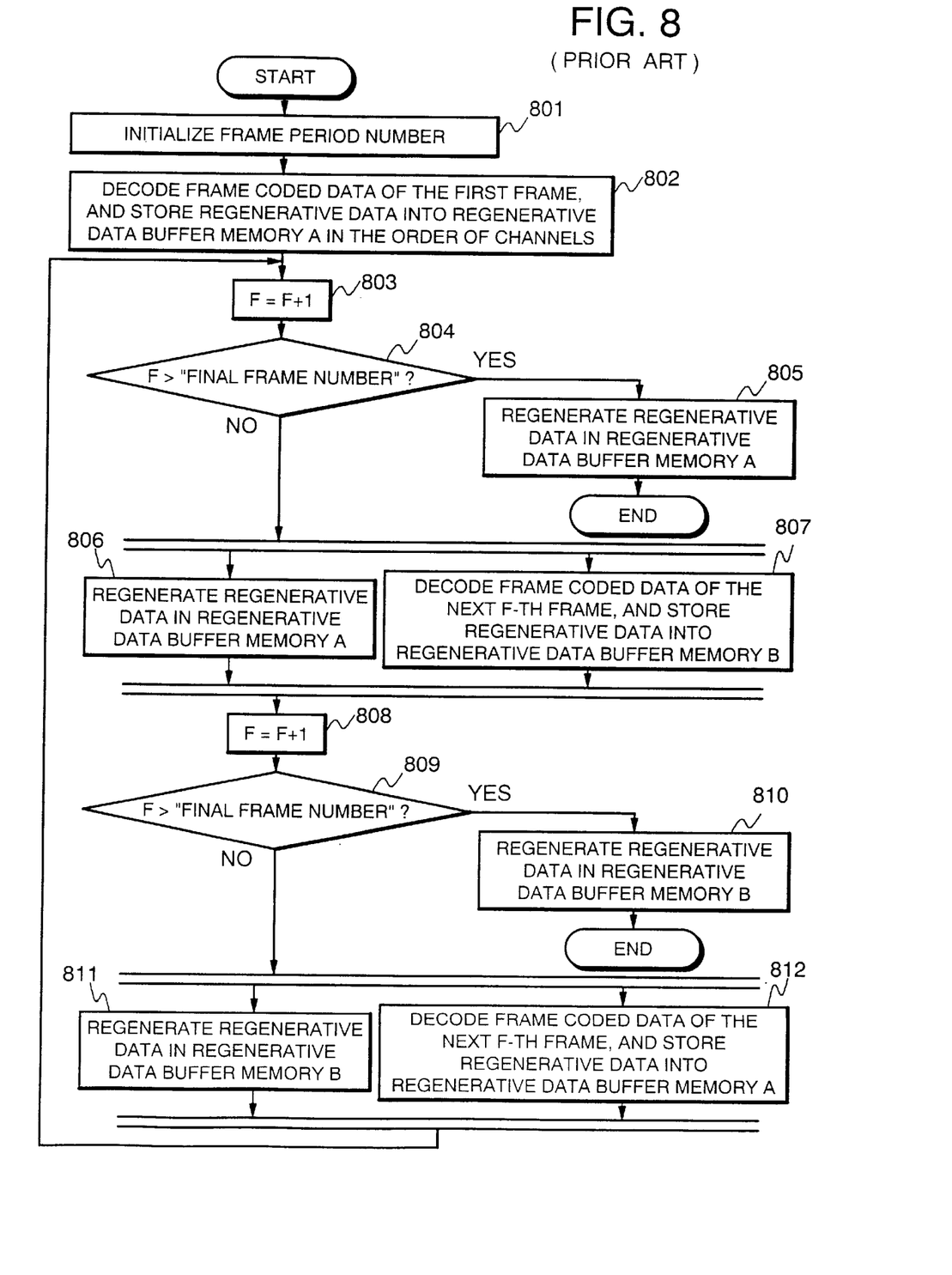
FIG. 8 is a flowchart illustrating the operation of the conventional decoding and regenerating device for frame coded data.

FIG. 8 is a flowchart illustrating the operation of a conventional decoding and regenerating device for frame coded data.

Referring to the flowchart of FIG. 8, the decoding unit 20 reads to decode frame coded data for one frame of the respective channels in the first frame period and stores the obtained regenerative data into the regenerative data buffer memory 60 (steps 801, 802).

Then, it is judged whether the frame in question is a final frame by the decoding unit 20 (steps 803, 804) and when it is a final frame, the data regenerating unit 50 completes its processing after regenerating the regenerative data which is stored in the regenerative data buffer memory 60 (step 805). When it is not a final frame, the data regenerating unit 50 regenerates the regenerative data which is stored in the regenerative data buffer memory 60 (step 806), and the decoding unit 20 reads to decode the frame coded data for the next one frame at every channel and stores the obtained regenerative data into another regenerative data buffer memory 70 (step 807).

And, the frame in question is judged whether it is a final frame (steps 808, 809), and when it is a final frame, the data regenerating unit 50 completes the processing after regenerating the regenerative data which is stored in the regenerative data buffer memory 60 (step 810). When it is not a final frame, the data regenerating unit 50 regenerates the regenerative data which is stored in the regenerative data buffer memory 70 (step 811), reads to decode the frame coded data for the next single frame at every channel, and stores again the obtained regenerative data into the regenerative data buffer memory 60 (step 812).

As described above, the regenerative data alternately decoded in every frame period is stored by the two groups of regenerative data buffer memories 60, 70. The regenerative data is given to the data regenerating unit 50. Thus, the frame coded data of the plurality of parallel channels are decoded and regenerated.

As described above, the conventional decoding and regenerating device for frame coded data has disadvantages that it needs two groups of regenerative data buffer memories to store regenerative data, resulting in hindering the device from being made compact and raising the cost.

SUMMARY OF THE INVENTION

It is an object of the invention to provide a decoding and regenerating device for frame coded data, which can decode to regenerate frame coded data of a plurality of parallel channels by a single regenerative data buffer memory and which can be made compact and produced at a low cost, and a decoding and regenerating method.

To accomplish this object, a decoding and regenerating device is provided for frame coded data which samples time series signals of a plurality of parallel channels, determines a given time interval as a single frame period, obtains frame coded data by coding as a single unit a plurality of samples which are contained in the frame in every single frame period on a channel-by-channel basis, and decodes to simultaneously regenerate the frame coded data of the plurality of channels.

The decoding and regenerating device, according to a first aspect of the invention, includes a decoder, a temporary data storage device, a regenerative data storage device, and a data regenerating means. The decoder decodes the frame coded data by inputting every channel of the time series signals on a frame-by-frame basis. The temporary data storage device temporarily stores regenerative data for one frame of a single channel which is decoded by the decoder.

The regenerative storage device stores data by placing memory blocks, which have memory spaces for the number of words substantially corresponding to a quotient obtained by dividing the number of samples of the time series signals per frame by the number of channels of the time series signals, to form a square matrix of rows and columns in number corresponding to the number of channels of the time series signals. The regenerative storage device further selects, alternately, in every frame period either a first data arrangement or a second data arrangement. According to the first data arrangement, the regenerative data for one frame of the respective channels is stored in every row of the square matrix as a stored state of the regenerative data. According to the second data arrangement, the regenerative data for one frame of the respective channels is stored in every column. In this way the regenerative storage device sequentially stores the regenerative data which is stored in the temporary data storage device.

The data regenerating means reads the regenerative data which is stored in the regenerative data storage device and regenerates the regenerative data for all channels simultaneously.

Preferably, in the event the number of samples of the time series signals per frame is not a multiple of the number of channels of the time series signals, the respective memory blocks of the regenerative data storage device adjusts the number of words in an address space among the plurality of memory blocks so as to have address spaces for the number of words which corresponds to the number of samples of the time series signals per frame by the memory blocks as a whole to configure a given row or column.

Additionally, there are preferable ways for the data regenerating means to read data from the regenerative data storage device, depending upon whether the regenerative data is stored in the regenerative data storage device according to the first or second data arrangement.

In the event the regenerative data is stored in the regenerative data storage device according to the first data arrangement, the data regenerating means reads to regenerate the regenerative data which is stored in the memory blocks in the same columns of respective rows in the order from the first column of the square matrix of the memory blocks in the regenerative data storage device, and the regenerative data storage device repeats the processing of storing the regenerative data for one frame of a single channel stored in the temporary storing means into the memory blocks of the column from which reading by the data regenerating means has completed, up to the final column of the square matrix of the memory blocks in the regenerative data storing means.

In the event the regenerative data is stored in the regenerative data storage device according to the second data arrangement, the data regenerating means reads to regenerate the regenerative data which is stored in the memory blocks in the same columns of respective rows in the order from the first column of the square matrix of the memory blocks in the regenerative data storage device repeats the processing of storing the regenerative data for one frame of a single channel which is stored in the temporary storage device into the memory blocks of the row from which reading by the data regenerating means has completed, up to the final column of the square matrix of the memory blocks in the regenerative data storage device.

A second aspect of the invention is a decoding and regenerating method for frame coded data. The method includes a step of decoding frame coded data at a plurality of channels of time series signals on a frame-by-frame basis, a step of temporarily storing regenerative data for one frame of a single channel which has been decoded via the decoding step, a step of regenerating by storing data alternatively according to the first and second data arrangements (as described above with regard to the first aspect of the invention) and then sequentially reading the regenerative data thusly stored. According to this method, the regenerative data is regenerated simultaneously for all channels.

A third aspect of the invention is a computer readable memory which stores therein a computer program for controlling a decoding and regenerating device for frame coded data. When implemented in the decoding and regenerating device, the computer program performs a method according to the second aspect of the invention.

Other objects, features and advantages of the present invention will become clear from detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessarily obscure the present invention.

Figure 1:
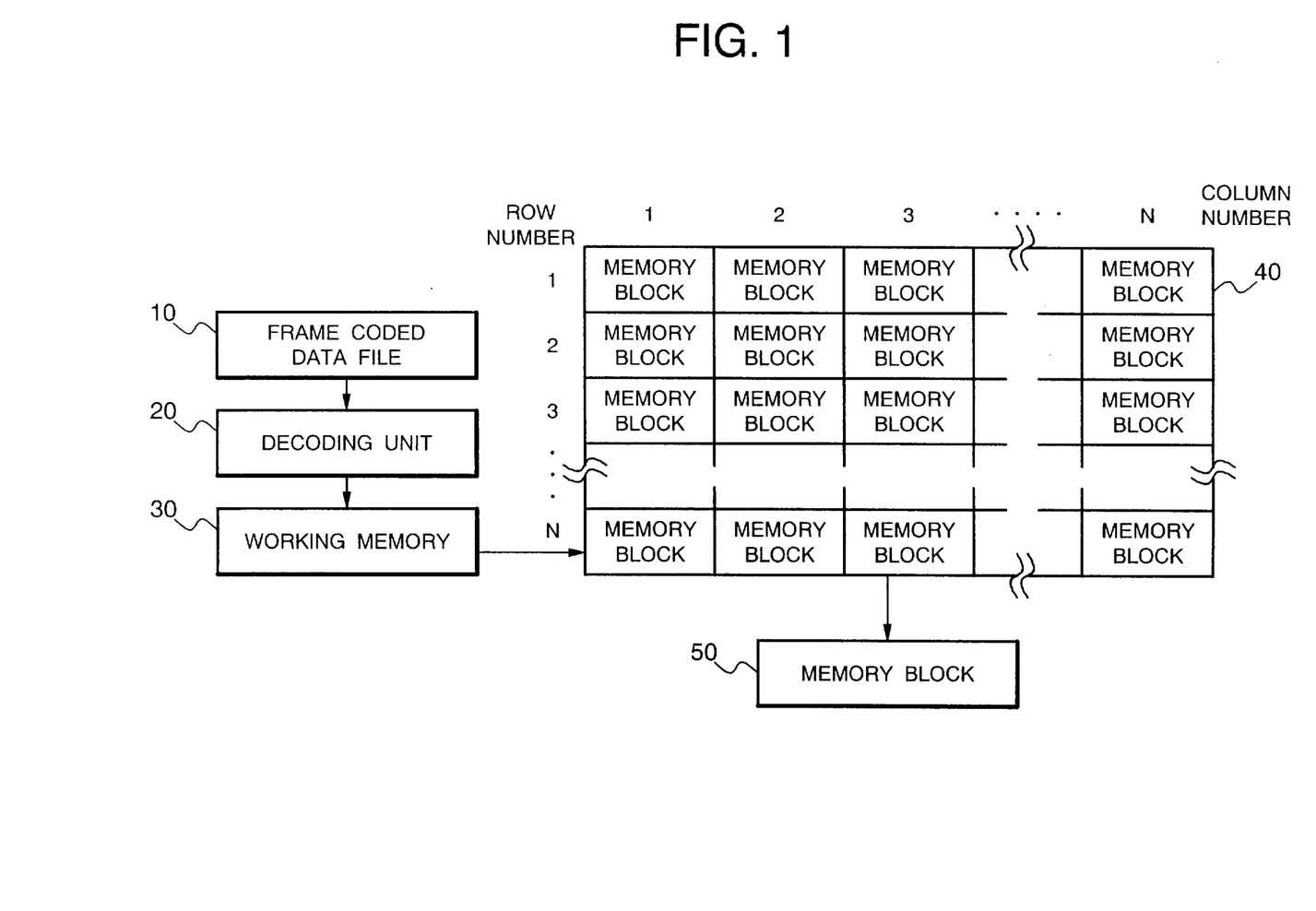
FIG. 1 is a block diagram showing a structure of the decoding and regenerating device for frame coded data according to one embodiment of the invention.

FIG. 1 is a block diagram showing a structure of the decoding and regenerating device for frame coded data according to a first embodiment of the invention.

Referring to FIG. 1, the decoding and regenerating device of this embodiment comprises a frame coded data file 10 which stores frame coded data, a decoding unit 20 which decodes the coded data stored in the frame coded data file 10 on a frame basis, a working memory 30 which stores the regenerative data of one frame for a single channel, a single regenerative data buffer memory 40, and a data regenerating unit 50 which regenerates the regenerative data. FIG. 1 shows only the characteristic structure of the embodiment and does not show other general structures.

The decoding unit 20 and the data regenerating unit 50 in the above structure are achieved by a CPU controlled by a computer program, a RAM and other internal memories. And, the frame coded data file 10, the working memory 30 and the regenerative data buffer memory 40 are achieved by a RAM, another internal memory, a magnetic disk device or another external storage device. The computer program which controls the CPU is provided in the form stored in a magnetic disk, a semiconductor memory or another storage medium, and the pertinent computer program is loaded into the internal memory to achieve the functions of the decoding unit 20 and the data regenerating unit 50.

When it is assumed that the number of decoded samples per frame is "M (=natural number 2 or more)" and the number of channels is "N (=natural number 2 or more; and N<M)", the working memory 30 has address spaces for M words and stores M regenerative data for one frame. And, the regenerative data buffer memory 40 divides the frame memory, which stores M regenerative data for one frame at every channel, into N memory blocks which are equally divided by the number of channels N and places them in a square matrix of N rows and N columns. Each memory block has address spaces for [M/N] words and stores [M/N] regenerative data.

The address spaces for [M/N] words mean to have the address spaces for M words by the N memory blocks as a whole configuring a given one row or one column in the regenerative data buffer memory 40 and to have the address spaces for the number of words corresponding to an integer closest to a numerical value (M/N) in respective memory blocks. When the numerical value (M/N) is not an integer, the number of words in the address spaces are adjusted among a plurality of memory blocks so to have the address space for M words as a whole. For example, when M=4 and N=3, two memory blocks have an address space for one word, and the remaining one memory block has an address space for two words. This is also applied to [M/N] regenerative data to be stored into the memory block.

Figure 2:
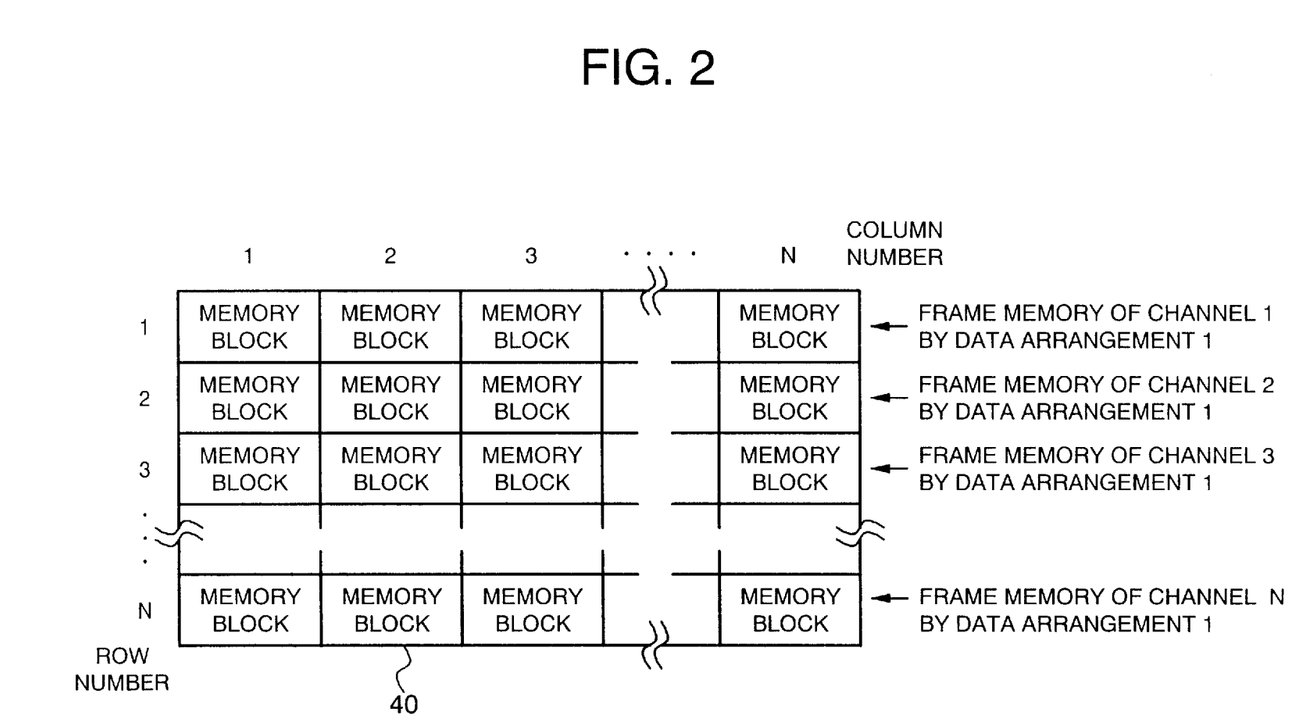
FIG. 2 is a data layout in a regenerative data buffer memory to illustrate "data arrangement 1" to store regenerative data for one frame of each channel on a row-by-row basis.
Figure 3:
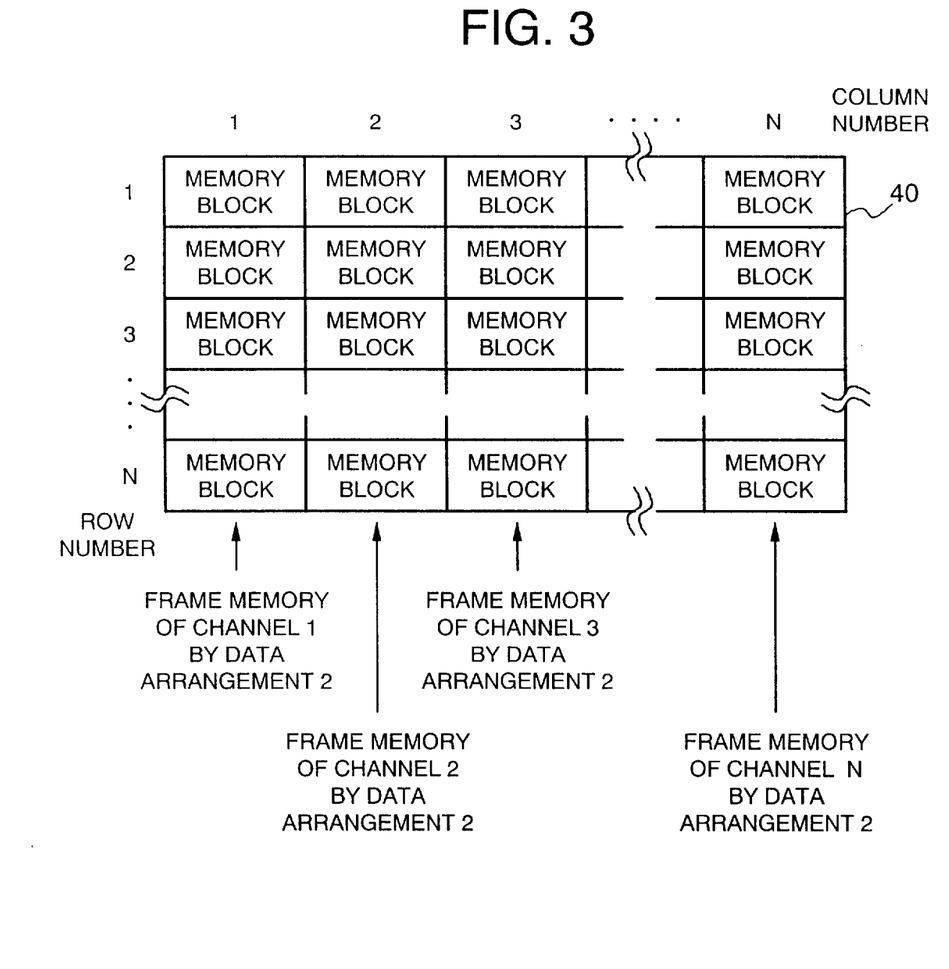
FIG. 3 is a data layout in a regenerative data buffer memory to illustrate "data arrangement 2" to store regenerative data for one frame of each channel on a column-by-column basis.

To store the decoded regenerative data into the regenerative data buffer memory 40, the frame memory has two types of structures, "data arrangement 1" which stores the regenerative data for one frame of each channel at every row in the square matrix of N rows and N columns and "data arrangement 2" which stores the regenerative data for one frame of each channel at every column. FIG. 2 shows the data arrangement in the regenerative data buffer memory 40 with the frame memories configured according to the "data arrangement 1", and FIG. 3 shows the data arrangement in the regenerative data buffer memory 40 with the frame memories configured according to the "data arrangement 2".

Now, referring to the flowcharts of FIG. 4 through FIG. 6, description will be made of the operation of the decoding and regenerating device for frame coded data in this embodiment.

Figure 4:
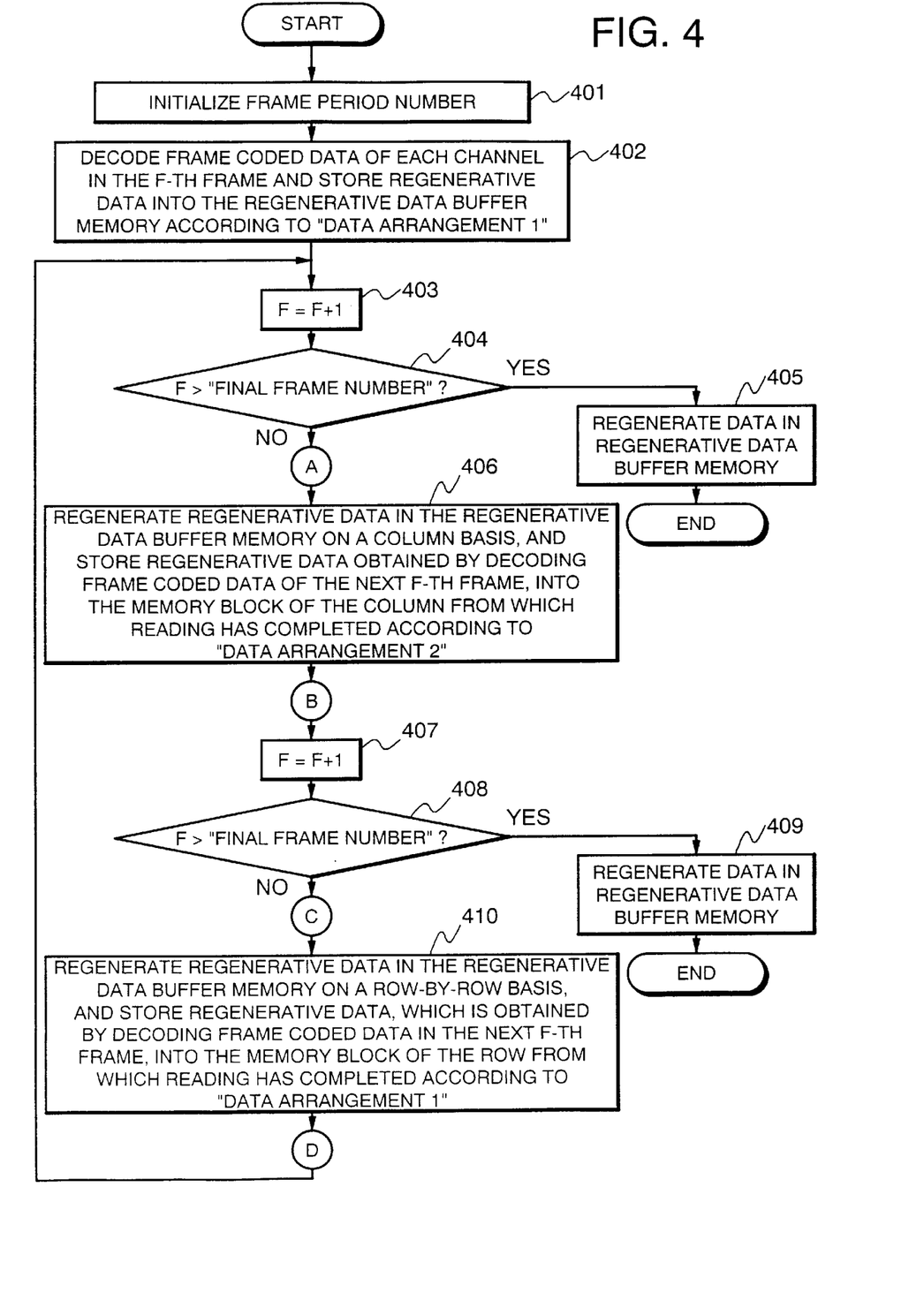
FIG. 4 is a flowchart illustrating the operation of the decoding and regenerating device for frame coded data of the invention.
Figure 5:
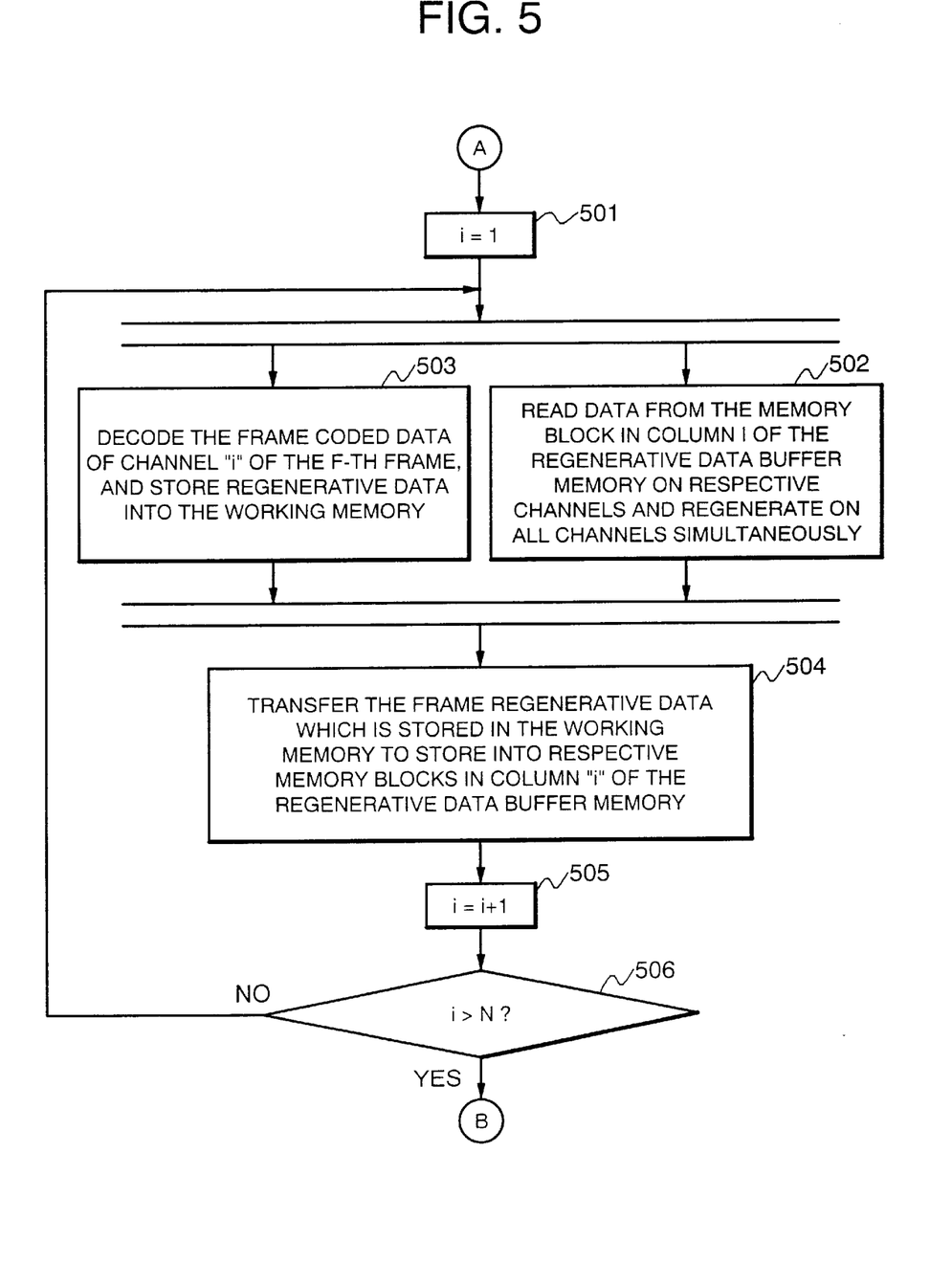
FIG. 5 is a flowchart illustrating in detail the operation of step 406 shown in FIG. 4.
Figure 6:
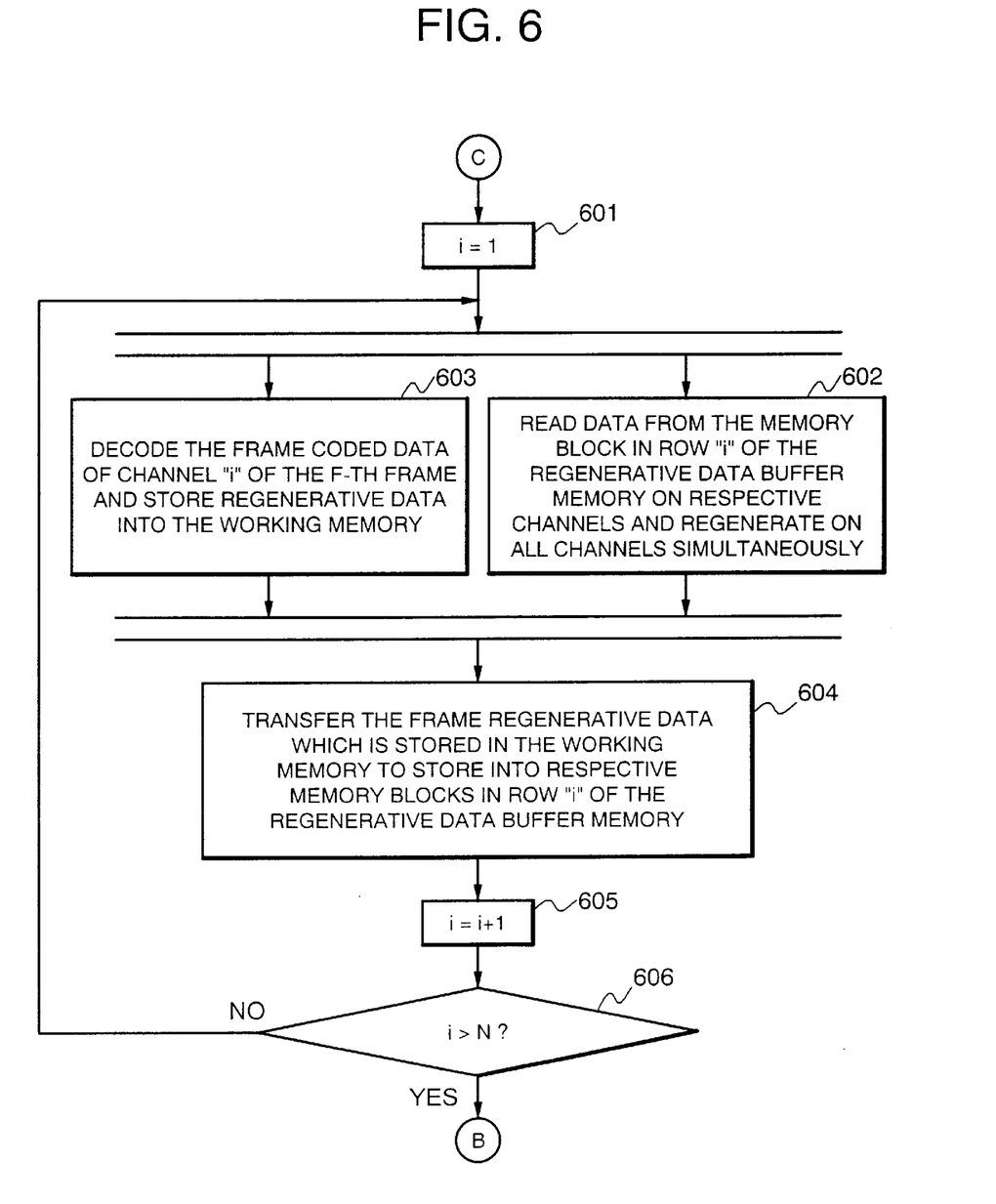
FIG. 6 is a flowchart illustrating in detail the operation of step 402 shown in FIG. 4.

Referring to FIG. 4 through FIG. 6, the decoding unit 20 reads to decode the frame coded data for one frame of each channel in the first frame period, and stores the obtained regenerative data in the order of channels into the frame memory at every channel of the regenerative data buffer memory 40 (steps 401, 402). Thus, the regenerative data is stored according to the "data arrangement 1".

Then, it is judged whether the frame in question is a final frame by the decoding unit 20 (steps 403, 404), and when it is a final frame, the data regenerating unit 50 reads the regenerative data of each channel stored according to the "data arrangement 1" from the regenerative data buffer memory 40 in every sampling period and regenerates original signals of all channels simultaneously (step 405).

When the frame in question is not a final frame, the data regenerating unit 50 reads to regenerate the regenerative data which is stored in the regenerative data buffer memory 40 for every column, and the decoding unit 20 reads to decode the frame coded data for the next single frame at every channel and stores the obtained regenerative data into the memory block of the column in the regenerative data buffer memory 40 from which reading has completed (step 406).

The process in step 406 will be described in detail with reference to FIG. 5. The data regenerating unit 50 reads the regenerative data which is stored in the memory block of the first column at every channel (every row) of the regenerative data buffer memory 40 and regenerates original signals of all channels simultaneously (steps 501, 502). At the same time, the decoding unit 20 reads to decode frame coded data of the first channel of the next frame in question and stores the obtained regenerative data into the working memory 30 (step 503). Then, regenerative data for one frame stored in the working memory 30 is stored into the memory block in the first column of the regenerative data buffer memory 40 which is now blank by being read by the data regenerating unit 50 (step 504). Then, the column undergone the reading of regenerative data from the memory block is judged whether it is a final column (N-th column) in the regenerative data buffer memory 40 (steps 505, 506). Thus, steps 501 through 506 are repeated up to the final column.

When the processing in step 406 (namely, the processing in steps 501 through 506 shown in FIG. 5) is completed, the regenerative data is stored into the regenerative data buffer memory 40 according to the "data arrangement 2".

Then, it is judged whether the frame in question is a final frame by the decoding unit 20 (steps 407, 408), and when it is a final frame, the data regenerating unit 50 reads the regenerative data of each channel, which is stored according to the "data arrangement 2", from the regenerative data buffer memory 40 in every sampling period and regenerates original signals of all channels simultaneously (step 409).

When the frame in question is not a final frame, the data regenerating unit 50 reads to regenerate the regenerative data which is stored in the regenerative data buffer memory 40 for every row, and the decoding unit 20 reads to decode the frame coded data for the next single frame at every channel and stores the obtained regenerative data into the memory block of the row in the regenerative data buffer memory 40 from which reading has completed (step 410).

The process in step 410 will be described in detail with reference to FIG. 6. The data regenerating unit 50 reads the regenerative data which is stored in the memory block of the first row at every channel (every column) of the regenerative data buffer memory 40 and regenerates original signals of all channels simultaneously (steps 601, 602). At the same time, the decoding unit 20 reads to decode frame coded data of the first channel of the next frame in question and stores the obtained regenerative data into the working memory 30 (step 603). Then, regenerative data for one frame which is stored in the working memory 30 is stored into the memory block in the first row of the regenerative data buffer memory 40 which is now blank by being read by the data regenerating unit 50 (step 604). Then, the row undergone the reading of regenerative data from the memory block is judged whether it is a final row (N-th row) in the regenerative data buffer memory 40 (steps 605, 606). Thus, steps 501 through 506 are repeated up to the final row.

When the processing in step 410 (namely, the processing in steps 601 through 606 shown in FIG. 6) is completed, the regenerative data is stored again into the regenerative data buffer memory 40 according to the "data arrangement 1".

As described above, by alternately repeating the "data arrangement 1" and the "data arrangement 2" as the stored state of regenerative data in the regenerative data buffer memory 40, the frame coded data of the plurality of parallel channels can be decoded and regenerated.

As described above, the decoding and regenerating device for frame decoded data and its decoding and regenerating method according to the invention can decode and regenerate the frame coded data of the plurality of parallel channels by the single regenerative data buffer memory, so that the device can be made compact and its cost can be reduced.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A decoding and regenerating device for frame coded data which samples time series signals of a plurality of parallel channels, determines a given time interval as a single frame period, obtains frame coded data by coding as a single unit a plurality of samples which are contained in the frame in every single frame period on a channel-by-channel basis, and decodes to simultaneously regenerate the frame coded data of the plurality of channels, comprising:

a decoding means for decoding said frame coded data by inputting every channel of said time series signals on a frame-by-frame basis;

a temporary storing means for temporarily storing regenerative data for one frame of a single channel which is decoded by said decoding means;

a regenerative data storing means which places memory blocks, which have memory spaces for the number of words substantially corresponding to a quotient obtained by dividing the number of samples of said time series signals per frame by the number of channels of said time series signals, to form a square matrix of rows and columns in number corresponding to the number of channels of said time series signals, and selects alternately in every frame period a first data arrangement that the regenerative data for one frame of said respective channels is stored in every row of said square matrix as a stored state of said regenerative data and a second data arrangement that regenerative data for one frame of said respective channels is stored in every column, to sequentially read to store said regenerative data which is stored in said temporary storing means; and a data regenerating means for reading said regenerative data which is stored in said regenerative data storing means and regenerating said regenerative data for all channels simultaneously.

2. The decoding and regenerating device for frame coded data as set forth in claim 1, wherein when the number of samples of said time series signals per frame is not a multiple of the number of channels of said time series signals, said respective memory blocks of said regenerative data storing means adjusts the number of words in an address space among said plurality of memory blocks so to have address spaces for the number of words which correspond to the number of samples of said time series signals per frame by said memory blocks as a whole to configure a given row or column.

3. The decoding and regenerating device for frame coded data as set forth in claim 1, wherein when said regenerative data is stored in said regenerative data storing means by said first data arrangement, said data regenerating means reads to regenerate said regenerative data which is stored in said memory blocks in the same columns of respective rows in the order from said first column of said square matrix of said memory blocks in said regenerative data storing means, and said regenerative data storing means repeats the processing of storing said regenerative data for one frame of a single channel stored in said temporary storing means into said memory blocks of the column from which reading by said data regenerating means has completed, up to the final column of said square matrix of said memory blocks in said regenerative data storing means; and when said regenerative data is stored in said regenerative data storing means by the second data arrangement, said data regenerating means reads to regenerate said regenerative data which is stored in said memory blocks in the same columns of respective rows in the order from the first column of said square matrix of said memory blocks in said regenerative data storing means, and said regenerative data storing means repeats the processing of storing said regenerative data for one frame of a single channel which is stored in said temporary storing means into said memory blocks of the row from which reading by said data regenerating means has completed, up to the final column of said square matrix of said memory blocks in said regenerative data storing means.

4. A decoding and regenerating method for frame coded data which samples time series signals of a plurality of parallel channels, determines a given time interval as a single frame period, obtains frame coded data by coding as a single unit a plurality of samples which are contained in said frame in every single frame period on a channel-by-channel basis, and decodes to simultaneously regenerate said frame coded data of said plurality of channels, comprising the steps of:

a step for decoding said frame coded data by inputting every channel of said time series signals on a frame-by-frame basis;

a step for temporarily storing regenerative data for one frame of a single channel which is decoded by said decoding step;

a step for regenerating by selecting alternately in every frame period a first data arrangement that said regenerative data for one frame of said respective channels is stored in every row of said square matrix as a stored state of said regenerative data and a second data arrangement that said regenerative data for one frame of said respective channels is stored on column-by-column basis, to store said regenerative data which is held by said temporary storing step into a regenerative data storing means in that memory blocks, which have memory spaces for the number of words substantially corresponding to a quotient obtained by dividing the number of samples of said time series signals per frame by the number of channels of said time series signals, are placed to form a square matrix of rows and columns in number corresponding to the number of channels of said time series signals, and sequentially reading said regenerative data which is stored in said regenerative data storing means to regenerate said regenerative data for all channels simultaneously.

5. The decoding and regenerating method for frame coded data as set forth in claim 4, wherein when said regenerative data is stored in said regenerative data storing means by the first data arrangement, said step for storing said regenerative data into said regenerative data storing means and sequentially regenerating repeats following steps, a step for reading to regenerate said regenerative data which is stored in said memory blocks of the same columns of respective rows in the order from the first column of said square matrix of memory blocks in said regenerative data storing means, and a step for storing said regenerative data for one frame of a single channel held by said temporary storing step into said memory blocks of the column from which reading has completed in said regenerative data storing means, up to the final column of said square matrix of said memory blocks in said regenerative data storing means; and when said regenerative data is stored by the second data arrangement into said regenerative data storing means, said step for storing said regenerative data into said regenerative data storing means and sequentially regenerating repeats following steps, a step for reading to regenerate said regenerative data which is stored in said memory blocks of the same rows of respective columns in the order from the first row of said square matrix of memory blocks in said regenerative data storing means, and a step for storing said regenerative data for one frame of a single channel held by said temporary storing step into said memory blocks of the row from which reading has completed in said regenerative data storing means, up to the final row of said square matrix of said memory blocks in said regenerative data storing means.

6. The decoding and regenerating method for frame coded data as set forth in claim 4, wherein when said regenerative data is stored in said regenerative data storing means by the first data arrangement, said step for storing said regenerative data into said regenerative data storing means and sequentially regenerating repeats following steps, a step for reading to regenerate said regenerative data which is stored in said memory blocks of the same columns of respective rows in the order from the first column of said square matrix of memory blocks in said regenerative data storing means, and a step for storing said regenerative data for one frame of a single channel held by said temporary storing step into said memory blocks of the column from which reading has completed in said regenerative data storing means, up to the final column of said square matrix of said memory blocks in said regenerative data storing means, and when said regenerative data is stored by the second data arrangement into said regenerative data storing means, said step for storing said regenerative data into said regenerative data storing means and sequentially regenerating repeats following steps, a step for reading to regenerate said regenerative data which is stored in said memory blocks of the same rows of respective columns in the order from the first row of said square matrix of memory blocks in said regenerative data storing means, and a step for storing said regenerative data for one frame of a single channel held by said temporary storing step into said memory blocks of the row from which reading has completed in said regenerative data storing means, up to the final row of said square matrix of said memory blocks in said regenerative data storing means; and further in parallel with said step for reading to regenerate said regenerative data on a columnby-column or row-by-row basis from said regenerative data storing means in said step for storing said regenerative data into said regenerative data storing means and sequentially regenerating, performs said decoding step and said temporary storing step on frame coded data in the next frame period of the frame under processing by said pertinent step.

7. A computer readable memory which stores therein a computer program for controlling a decoding and regenerating device for frame coded data which comprises sampling time series signals of a plurality of parallel channels, determining a given time interval as a single frame period, obtaining frame coded data by coding as a single unit a plurality of samples which are contained in the frame in every single frame period on a channel-by-channel basis, and decoding to regenerate said frame coded data of said plurality of channels simultaneously, wherein the computer program comprising the following steps:

a step for decoding said frame coded data by inputting every channel of said time series signals on a frame-by-frame basis;

a step for temporarily storing said regenerative data for one frame of a single channel which is decoded by said decoding step;

a step for regenerating by selecting alternately in every frame period a first data arrangement that said regenerative data for one frame of said respective channels is stored in every row of said square matrix as a stored state of said regenerative data and a second data arrangement that said regenerative data for one frame of said respective channels is stored on a column-by-column basis, to store said regenerative data which is held by said temporary storing step into a regenerative data storing means in that memory blocks, which have memory spaces for the number of words substantially corresponding to a quotient obtained by dividing the number of samples of said time series signals per frame by the number of channels of said time series signals, are placed to form a square matrix of rows and columns in number corresponding to the number of channels of said time series signals, and sequentially reading said regenerative data which is stored in said regenerative data storing means to regenerate said regenerative data for all channels simultaneously.

8. The computer readable memory as set forth in claim 7, wherein when said regenerative data is stored in said regenerative data storing means by the first data arrangement, said step for storing said regenerative data into said regenerative data storing means and sequentially regenerating according to the computer program repeats following steps, a step for reading to regenerate said regenerative data which is stored in said memory blocks of the same columns of respective rows in the order from the first column of said square matrix of memory blocks in said regenerative data storing means, and a step for storing said regenerative data for one frame of a single channel held by said temporary storing step into said memory blocks of the column from which reading has completed by said regenerative data storing means, up to the final column of said square matrix of said memory blocks in said regenerative data storing means; and when said regenerative data is stored by the second data arrangement into said regenerative data storing means, said step for storing said regenerative data into said regenerative data storing means and sequentially regenerating according to the computer program repeats following steps, a step for reading to regenerate said regenerative data which is stored in said memory blocks of the same rows of respective columns in the order from the first row of said square matrix of memory blocks in said regenerative data storing means, and a step for storing said regenerative data for one frame of a single channel held by said temporary storing step into said memory blocks of the row from which reading has completed in said regenerative data storing means, up to the final row of said square matrix of said memory blocks in said regenerative data storing means.

9. The computer readable memory as set forth in claim 7, wherein when said regenerative data is stored in said regenerative data storing means by the first data arrangement, said step for storing said regenerative data into said regeneration storing means and sequentially regenerating according to the computer program repeats following steps, a step for reading to regenerate said regenerative data which is stored in said memory blocks of the same columns of respective rows in the order from the first column of said square matrix of memory blocks in said regenerative data storing means, and a step for storing said regenerative data for one frame of a single channel held by said temporary storing step into said memory blocks of the column from which reading has completed in said regenerative data storing means, up to the final column of said square matrix of said memory blocks in said regenerative data storing means; and when said regenerative data is stored by the second data arrangement into said regenerative data storing means, said step for storing said regenerative data into said regeneration storing means and sequentially regenerating according to the computer program repeats following steps, a step for reading to regenerate said regenerative data which is stored in said memory blocks of the same rows of respective columns in the order from the first row of said square matrix of memory blocks in said regenerative data storing means, and a step for storing said regenerative data for one frame of a single channel held by said temporary storing step into said memory blocks of the row from which reading has completed in said regenerative data storing means, up to the final row of said square matrix of said memory blocks in said regenerative data storing means; and further in parallel with said step for reading to regenerate said regenerative data on a columnby-by-column or row-by-row basis from said regenerative data storing means in said step for storing said regenerative data into said regenerative data storing means and sequentially regenerating, performs said decoding step and said temporary storing step on frame coded data in the next frame period of the frame under processing by the pertinent step.

\* \* \* \* \*